United States Patent
Edwards et al.

(10) Patent No.: US 10,341,491 B1
(45) Date of Patent: Jul. 2, 2019

(54) IDENTIFYING UNREPORTED ISSUES THROUGH CUSTOMER SERVICE INTERACTIONS AND WEBSITE ANALYTICS

(71) Applicant: Capital One Services, LLC, McLean, VA (US)

(72) Inventors: Joshua Edwards, Philadelphia, PA (US); Michael Mossoba, Arlington, VA (US); Abdelkader M'Hamed Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/200,101

(22) Filed: Nov. 26, 2018

(51) Int. Cl.
| | |
|---|---|
| H04M 3/51 | (2006.01) |
| G06F 11/34 | (2006.01) |
| G06F 17/27 | (2006.01) |
| G06Q 30/00 | (2012.01) |
| G10L 15/26 | (2006.01) |

(52) U.S. Cl.
CPC ....... *H04M 3/5191* (2013.01); *G06F 11/3409* (2013.01); *G06F 17/278* (2013.01); *G06F 17/2785* (2013.01); *G06Q 30/016* (2013.01); *G10L 15/26* (2013.01)

(58) Field of Classification Search
CPC ..... G06F 17/2785; G06F 17/28; G06Q 10/06; H04M 3/493
See application file for complete search history.

(56) References Cited

U.S. PATENT DOCUMENTS

| | | | | |
|---|---|---|---|---|
| 6,671,818 | B1 * | 12/2003 | Mikurak | G06Q 10/06 714/4.21 |
| 7,124,101 | B1 * | 10/2006 | Mikurak | G06Q 10/06 705/35 |
| 9,009,046 | B1 * | 4/2015 | Stewart | G10L 15/18 704/251 |
| 9,274,873 | B2 * | 3/2016 | Ye | G06F 11/0709 |
| 9,715,496 | B1 * | 7/2017 | Sapoznik | G06F 17/2715 |
| 10,055,481 | B2 * | 8/2018 | Ideses | G06F 21/00 |
| 10,083,106 | B2 * | 9/2018 | Moran | G06F 11/362 |
| 2005/0193055 | A1 * | 9/2005 | Angel | G06Q 30/02 709/202 |
| 2007/0150500 | A1 * | 6/2007 | Kawada | G06Q 10/10 |
| 2009/0076795 | A1 * | 3/2009 | Bangalore | G06F 17/2785 704/9 |

(Continued)

*Primary Examiner* — Matthew H Baker

(57) ABSTRACT

Identifying unreported issues in computing applications based on customer service interactions and website analytics. A computing system may receive communication data between a CSP and a user. The system may analyze the communication data using an NLP algorithm to identify a plurality of concepts in the communication data. The system may identify, based on the concepts, a target application associated with the communications between the CSP and the user. The system may receive analytics data from a web server hosting the target application and identify a feature of the target application that is not functioning. The system may then assign a priority to the feature of the target application that is not functioning based on a type of the feature and the received analytics data and generate a service issue record for the feature of the target application that is not functioning and the assigned priority.

18 Claims, 6 Drawing Sheets

(56) References Cited

U.S. PATENT DOCUMENTS

| | | | |
|---|---|---|---|
| 2010/0229112 A1* | 9/2010 | Ergan | G06F 3/04895 |
| | | | 715/764 |
| 2013/0179440 A1* | 7/2013 | Gordon | G06Q 10/06 |
| | | | 707/731 |
| 2014/0310714 A1* | 10/2014 | Chan | G06F 9/4881 |
| | | | 718/102 |
| 2016/0042359 A1* | 2/2016 | Singh | G06Q 30/016 |
| | | | 704/2 |
| 2018/0165691 A1* | 6/2018 | Heater | G06Q 30/016 |
| 2018/0165723 A1* | 6/2018 | Wright | G06Q 30/0201 |

\* cited by examiner

IDENTIFYING UNREPORTED ISSUES THROUGH CUSTOMER SERVICE INTERACTIONS AND WEBSITE ANALYTICS

TECHNICAL FIELD

Embodiments herein generally relate to computing applications, and more specifically, to programmatically identifying unreported issues for computing functions using customer service interactions and website analytics.

BACKGROUND

Customer service interactions, especially in servicing and e-commerce arenas, center around ensuring that a customer can complete a desired transaction and/or perform a desired action. Important functionality issues (and relevant details about those issues) that may be affecting millions of customers might be missed or go unreported once the customer service professional (CSP) "resolves" the issue for the customer. For example, the CSP may instruct a customer to place an order through their cellular network instead of using their home internet connection. However, addressing the customer's complaint may not resolve the underlying technical issue. Indeed, addressing the customer's complaint in such a fashion may allow the underlying technical issue to go undetected for extended periods of time.

SUMMARY

Embodiments disclosed herein provide systems, methods, articles of manufacture, and computer-readable media for programmatically identifying unreported service issues using customer service interactions and website analytics. According to such embodiments, a computing system may receive communication data comprising communications between a CSP and a user. The system may analyze the communication data using a natural language processing (NLP) algorithm to identify a plurality of concepts in the communication data. The system may then identify, based at least in part on the plurality of concepts, a target application associated with the communications between the CSP and the user. The system may receive analytics data from a web server hosting the target application, and identify, based at least in part on the plurality of concepts and the received analytics data, a feature of the target application that is not functioning. The system may then assign a priority to the feature of the target application that is not functioning based at least in part on a type of the feature and the received analytics data, and generate a service issue record for the feature of the target application that is not functioning and the assigned priority, the service issue record to facilitate an analysis of a source code of the target application.

DETAILED DESCRIPTION

Figure 1:
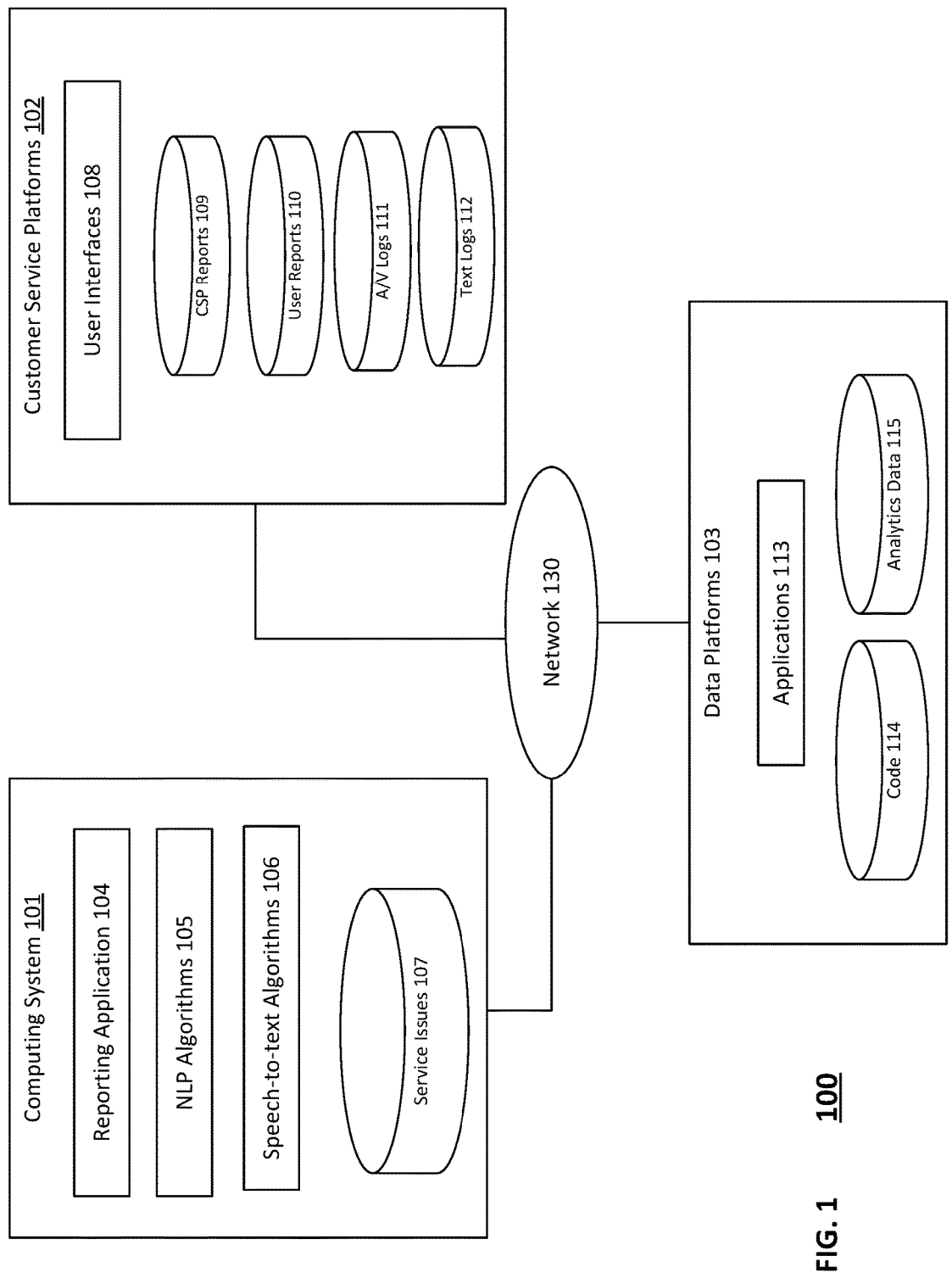
FIG. 1 illustrates an embodiment of a system.

Embodiments disclosed herein provide techniques to identify unreported issues in applications based on customer service interactions and website analytics. The customer service interactions may include text-based interactions and speech-based interactions between CSPs and one or more users. Embodiments disclosed herein may process the speech-based interactions using speech-to-text algorithms to generate a text transcription of the speech-based interactions. Embodiments disclosed herein may apply natural language processing (NLP) algorithms to the text-based interactions and the text transcriptions to extract concepts from the text. Doing so allows embodiments disclosed herein to programmatically identify applications and/or features thereof that may not be functioning correctly.

Furthermore, embodiments disclosed herein may leverage website analytics data to identify and/or confirm the applications and/or features that are not functioning correctly. Once identified and/or confirmed, embodiments disclosed herein may apply a priority to each identified application and/or feature that is not functioning correctly, and define a time period for causing the application and/or feature to function properly. Indications of the priority, time period, and identified applications and/or features that are not functioning may then be generated and transmitted to troubleshooting professionals who may further investigate to fix any underlying issues.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes one or more computing systems 101, one or more customer service platforms 102, and one or more data platforms 103 communicably coupled via a network 130. The computing systems 101, customer service platforms 102, and data platforms 103 are representative of any type of computing system, such as a server, workstation, compute cluster, virtualized computing system, cloud computing environment, data center, and the like.

The computing system 101 includes a reporting application 104, one or more natural language processing algorithms 105, one or more speech-to-text algorithms 106, and a data store of service issues 107. The customer service platforms 102 include one or more user interfaces 108, one or more CSP reports 109, one or more user reports 110, one or more audio/video (A/V) logs 111, and one or more text logs 112. The data platforms 103 include one or more applications 113, a data store of code 114, and a data store of analytics data 115.

The customer service platforms 102 are representative of any type of platform that allows users to communicate with customer service professionals via one or more user interfaces 108. For example, the user interfaces 108 may include text-based user interfaces (e.g., chat rooms, email clients, dedicated chat applications, social media applications, etc.) and voice-based user interfaces (e.g., telephone calls, voice over IP applications, audio/video conferencing applications, etc.). Furthermore, the customer service platforms 102 may record the content of communications between the users and CSPs. For example, the customer service platform 102 may store a text-based chat between the user and a CSP as one of the text logs 112. As another example, the customer service platform 102 may store a recording of a voice-based call between a user and a CSP as one of the A/V logs 111.

The customer service platforms 102 allow users to receive assistance with a product and/or service. For example, a user may not be able to access an application 113 (e.g., a website, service, game, etc.) provided by the data platforms 103 to perform account-related activities within their bank account. The user may call a CSP professional of the bank for assistance using a video conferencing user interface 108. The CSP may instruct the user to perform one or more operations that ultimately allow the user to perform the desired account-related activity (e.g., open an account, make a payment, etc.). The customer service platform 102 may generate a recording of the video conference, and store the audio and/or video of the video conference as one of the A/V logs 111.

In addition, the user may complete a survey, form, or other report describing the communication session with a CSP, which may be saved as one of the user reports 110. In some embodiments, the user's report may include an indication of the problem and an indication of whether the CSP was able to help solve their problem. Continuing with the previous example, the user report 110 may indicate the inability to access the application 113 to perform the account-related activity, and that the CSP was able to help them perform the account-related activity. Similarly, the CSP may complete a report describing the interaction with the customer, which may be saved as one of the CSP reports 109. In some embodiments, the CSP report 109 may indicate the user's problem, and what steps (if any) were taken to resolve the problem. For example, the CSP report 109 may indicate that the CSP manually performed the account-related activity on behalf of the customer. However, manually performing the account-related activity may not resolve an underlying service issue in the application 113 (or some other component of the system 100) that is causing the associated account-related activity to not function properly. More generally, the CSP may not be aware of the service issue and/or refrain from communicating the service issue to the relevant professionals. Therefore, the service issue may continue to go undetected and/or unreported for extended periods of time.

Advantageously, however, the reporting application 104 may programmatically identify the underlying service issue in the application 113 (or other components of the system 100). Generally, the reporting application 104 may receive one or more of the CSP reports 109, user reports 110, A/V logs 111, and/or text logs 112 related to a given CSP communication session. The reporting application 104 may apply one or more speech-to-text algorithms 106 to any audio data in the A/V logs 111. Doing so may generate a text transcription of any speech in the A/V logs 111 (e.g., a transcription of the words spoken by the CSP and the user during a communication session). The reporting application 104 may further receive analytics data 115 from the data platforms 103. The analytics data 115 is representative of any type of web analytics data. For example, the analytics data 115 may include system log files (which may reflect a number and type of errors causing service issues), data describing requests to an application 113 and/or other resource (e.g., time of requests, numbers of requests, whether the requests were successfully fulfilled, etc.), data describing each instance of a plurality of instances of a given resource (e.g., instances of virtual machines, instances of applications 113 executing on the virtual machines, locations of the virtual machine instances, etc.), system uptimes, system downtimes, application uptime, application downtime, etc.

The reporting application 104 may then apply one or more NLP algorithms 105 to text data (e.g., the text transcription of the A/V logs 111, a text log 112, the relevant CSP reports 109, the relevant user reports 110, and/or the analytics data 115). The NLP algorithms 105 may extract concepts, features, semantic meanings of the concepts, and other data from the text data. Using the extracted concepts and/or the parse trees, the reporting application 104 may determine what application 113 is not functioning properly, and a feature of an application 113 that is not functioning properly. Furthermore, the reporting application 104 may identify a source code 114 that is associated with the application 113 that is not functioning properly. The reporting application 104 may identify the source code 114 based at least in part on the analytics data 115, which may indicate specific areas of the code 114 that are not functioning correctly. The code 114 may be of the application 113, a different application 113, and/or configuration data (and/or code) of an associated system. The NLP algorithms 105 may match the concepts from the A/V logs 111, a text log 112, the relevant CSP reports 109, and/or the relevant user reports 110 to the analytics data 115 to determine which portions of the analytics data 115 are associated with a service issue. The NLP algorithms 105 may further generate a parse tree for each statement in the text data. The reporting application 104 may then generate a service issue record in the service issues 107 describing the service issue (e.g., the application 113 that is not functioning properly, the feature of an application 113 that is not functioning properly, a system hosting the application 113, and the identified code 114 that is associated with the application 113 that is not functioning properly). An indication of the record (and/or the record itself) in the service issues 107 may then be transmitted to the relevant personnel to correct the service issue (e.g., troubleshooting teams, programmers, IT services personnel, etc.).

In some embodiments, the reporting application 104 may further include additional data in the record in the service issues 107. For example, the reporting application 104 may determine, based on the data generated by the NLP algorithms 105, one or more operations used by the CSP to resolve the issue for the user (e.g., manually performing an operation for the user, instructing the user to disconnect from Wi-Fi in favor of a wired network connection, etc.). The reporting application 104 may include indications of the determined operations as part of the record in the service issues 107. Furthermore, the reporting application 104 may include some or all of the text of the text logs 112 (and/or the transcriptions of the A/V logs 111) as part of the record in the service issues 107. In some embodiments, the reporting application 104 includes relevant portions of the text (e.g., portions of the text indicating a technical problem), while removing less relevant parts of the text (e.g., pleasantries exchanged by the CSP and user). The reporting application 104 may provide a link to the removed portions of the text, allowing a reviewing user to access the removed portions of text.

As another example, the reporting application 104 may determine a priority for the service issue and include the priority as part of the record in the service issues 107. The reporting application 104 may generally determine the priority based on the analytics data 115, the A/V logs 111, the text logs 112, the CSP reports 109, and/or the user reports 110. For example, the reporting application 104 may determine a percentage of users, geographic locations, and/or systems affected by the issue in the analytics data 115, and assign higher levels of priority to those service issues having greater affected percentages. The reporting application 104 may further include a time deadline for correcting the service issue in the record in the service issues 107. For example, the reporting application 104 may assign a one-hour deadline for high-priority service issues, a one-day deadline for medium priority service issues, and a one-week deadline for low priority service issues. As yet another example, the reporting application 104 may identify particular segments of the source code 114 that may be causing the service issue (e.g., based on the analytics data 115), and include indications of the identified segments of the source code 114 in the record in the services issues 107.

In some embodiments, the reporting application 104 determines the impact of a service issue based at least in part by analyzing the analytics data 115. For example, an application 113 may process 100,000 transactions per day on average. However, the analytics data 115 may reflect that the application 113 has processed 20,000 transactions in the most recent day. Based on the decrease in transaction processing, the reporting application 104 may determine that at least a portion of the transaction processing application 113 is not functioning correctly. Similarly, the reporting application 104 may determine that 80% of the instances of the transaction processing application 113 are not functioning correctly (while 20% of the instances are functioning correctly).

As another example, the reporting application 104 may determine a number of customers impacted by a service issue based on a volume of interactions between users and CSPs. For example, the reporting application 104 may determine that 100 calls from users reference the same error in an application 113. However, the reporting application 104 may determine that generally, only 10% of customers call to report errors. Therefore, the reporting application 104 may determine that 1,000 customers are being affected by the service issue.

Figure 2:
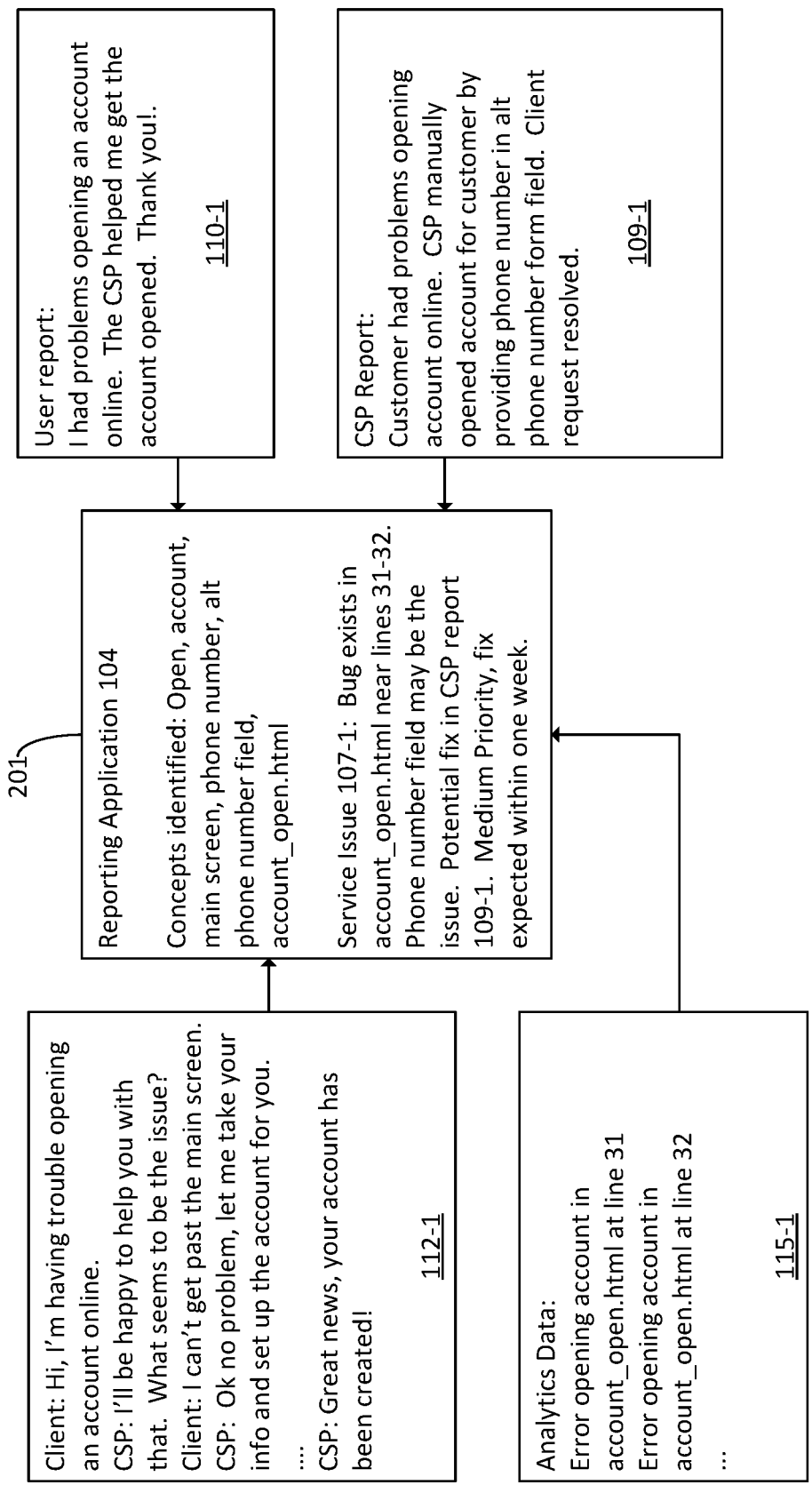
FIG. 2 illustrates an example of using customer service interactions and website analytics to identify unreported issues in computing applications.

FIG. 2 is a schematic 200 illustrating an example of using customer service interactions and website analytics to identify unreported issues in computing applications, according to one embodiment. As shown, the schematic 200 depicts a portion of an example text log 112-1, an example portion of analytics data 115-1, an example user report 110-1, and an example CSP report 109-1. Generally, the text log 112-1 reflects communications between a CSP and a user who is having difficulty opening an account using an online platform (e.g., one of the applications 113). The text log 112-1 further reflects that the CSP manually created the account for the user. The CSP report 109-1 reflects that the CSP used a workaround by entering the user's phone number in the alternate phone number field of the form provided by the application 113. The CSP report 109-1 further indicates that the issue has been resolved for the user. However, the CSP report 109-1 omits any indication that an issue exists in the application 113, and the issue may persist for other users.

Advantageously, the reporting application 104 receives the text log 112-1, analytics data 115-1, CSP report 109-1, and user report 110-1 to programmatically detect a service issue and generate a record for the service issue in the service issues 107. Block 201 reflects a portion of the processing performed by the reporting application 104 to detect a service issue and generate an example service issue record 107-1. For example, by analyzing the analytics data 115-1, the NLP algorithms 105 of the reporting application 104 may determine the concepts of "account" "open" and "main screen" from the text log 112-1. As another example, the NLP algorithms 105 may identify the concepts of "phone number" and "alt phone number field" in the CSP report 109-1. The NLP algorithms 105 may further determine the semantic meanings of each concept in the text log 112-1, the CSP report 109-1, and user report 110-1. As another example, the NLP algorithms 105 may analyze the analytics data 115 to determine the concept of "error opening account" (which may be one concept or multiple concepts). In some embodiments, additional techniques are applied to the analytics data 115. For example, the reporting application 104 may associate data in the analytics data 115 with a customer service interaction based on a time of the analytics data and a time of the customer service interaction. As another example, the reporting application may detect an increase in errors in the analytics data 115 and associate the detected errors with repeated concepts in logs of other customer service interactions (e.g., other CSP reports 109, user reports 110, A/V logs 111, and/or text logs 112).

The reporting application 104 may then identify a server hosting the instance of "account_open.html". For example, the reporting application 104 may identify the server based on an IP address of the server in the analytics data 115, server naming patterns used in the analytics data 115, and/or any other method for associating an event with a server. The NLP algorithms 105 and/or the reporting application 104 may identify a web server hosting the application 113 based on the analytics data 115-1. Using the data generated by the NLP algorithms 105, the reporting application 104 may detect a service issue in a server hosting account_open.html and generate an example service issue 107-1. For example, the NLP algorithms 105 may define relationships between the identified concepts, which indicate that lines 31 and 32 of account_open.html are at least partially responsible for the account opening function of account_open.html not functioning properly on the corresponding web server.

As stated, the reporting application 104 may further generate other data describing the service issue in the service issue record 107-1. For example, as shown, the reporting application 104 may indicate that the phone number field is related to the service issue in the service issue record 107-1, and that the CSP report 109-1 may include a potential fix. Doing so may allow a troubleshooter to review the CSP report 109-1 to quickly identify the workaround that allows accounts to be opened and modify the source code 114 of account_open.html accordingly. As another example, the reporting application 104 may assign the service issue record 107-1 a medium priority level, e.g., based on the type of service issue, the business impact of the service issue, the number of affected users, the number of affected instances of account_open.html, etc. The reporting application 104 may also provide a 1-week time frame for resolving the service issue 107-1. The exemplary format of the service issue 107-1 should not be considered limiting of the disclosure, as the service issues 107 may generally be of any format.

Figure 3:
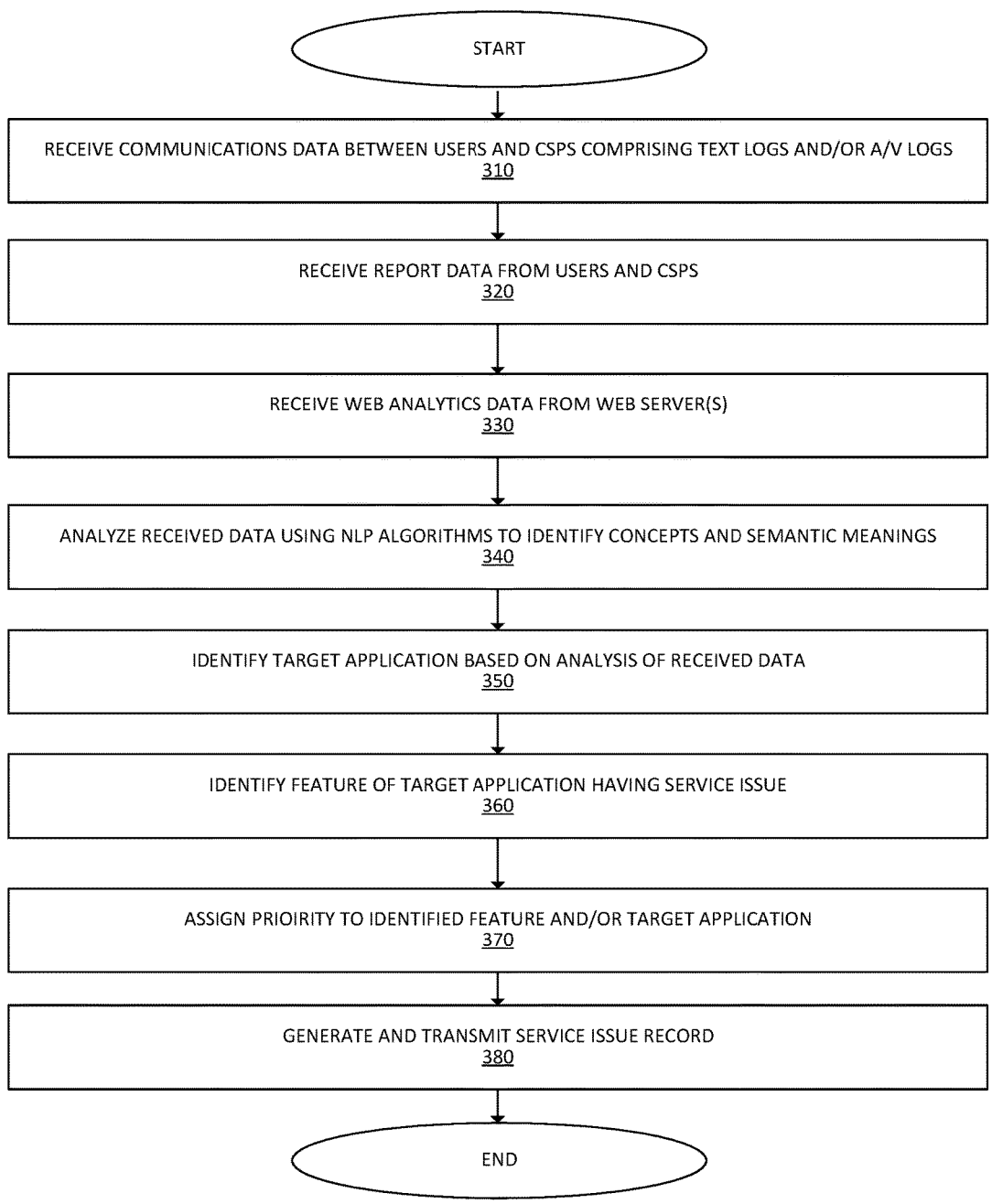
FIG. 3 illustrates an embodiment of a first logic flow.

FIG. 3 illustrates an embodiment of a logic flow 300. The logic flow 300 may be representative of some or all of the operations executed by one or more embodiments described herein. For example, the logic flow 300 may include some or all of the operations to use customer service interactions and website analytics to identify unreported issues in computing applications. Embodiments are not limited in this context.

As shown, the logic flow 300 begins at block 310, where the reporting application 104 receives communications between one or more CSPs and one or more users in the form of A/V logs 111 and/or text logs 112. For example, the communications data may reflect that a user cannot place an order, and the CSP instructed the user to disconnect from their home Wi-Fi in favor of a cellular data connection to place the order. As stated, the reporting application 104 may further apply the speech-to-text algorithms 106 to the audio data of the A/V logs 111 to generate text transcriptions of spoken conversations between the CSPs and users. At block 320, the reporting application 104 receives reports from the users and/or the CSPs, e.g., the CSP reports 109 and the user reports 110. The reports may include further detail describing the interaction that allowed the user to place the order.

At block 330, the reporting application 104 receives web analytics data 115. The analytics data 115 may be from a plurality of web servers. Each web server may host one or more instances of one or more applications 113, including an application used by the customer to place the order. At block 340, the reporting application 104 applies one or more NLP algorithms 105 to analyze the data received in blocks 310-330. Generally, the NLP algorithms 105 may extract concepts from the data, determine semantic meanings of the concepts, and/or determine the relationships between the concepts. For example, the NLP algorithms 105 may identify concepts related to placing the order, disconnecting from Wi-Fi, connecting to a cellular data connection, etc., the semantic meanings of these concepts, and the relationships between the concepts. The NLP algorithms 105 may further identify, based on the analytics data 115, an application 113 hosted by a server that is experiencing service issues which do not allow customers to place orders via Wi-Fi networks. At block 350, the reporting application 104 identifies a target application based on the analysis of the data performed at block 340. For example, the reporting application 104 may determine that the application 113 identified by the NLP algorithms 105 is an application that is having a service issue (e.g., not functioning properly). At block 360, the reporting application 104 determines a feature of the target application that is having a service issue (e.g., not functioning). For example, the ordering feature of the target application may be the feature that is not functioning. At block 370, the reporting application 104 determines and assigns a priority level to the feature and/or target application that is not functioning. The priority level may be assigned based on any number of factors, such as a projected monetary loss due to the service issue, whether other instances of the application are functioning properly, a number of affected users, etc. At block 380, the reporting application 104 generates a record in the service issues 107 for the identified application and/or feature hosted by the server and transmits an indication of the record to one or more personnel for resolution.

Figure 4:
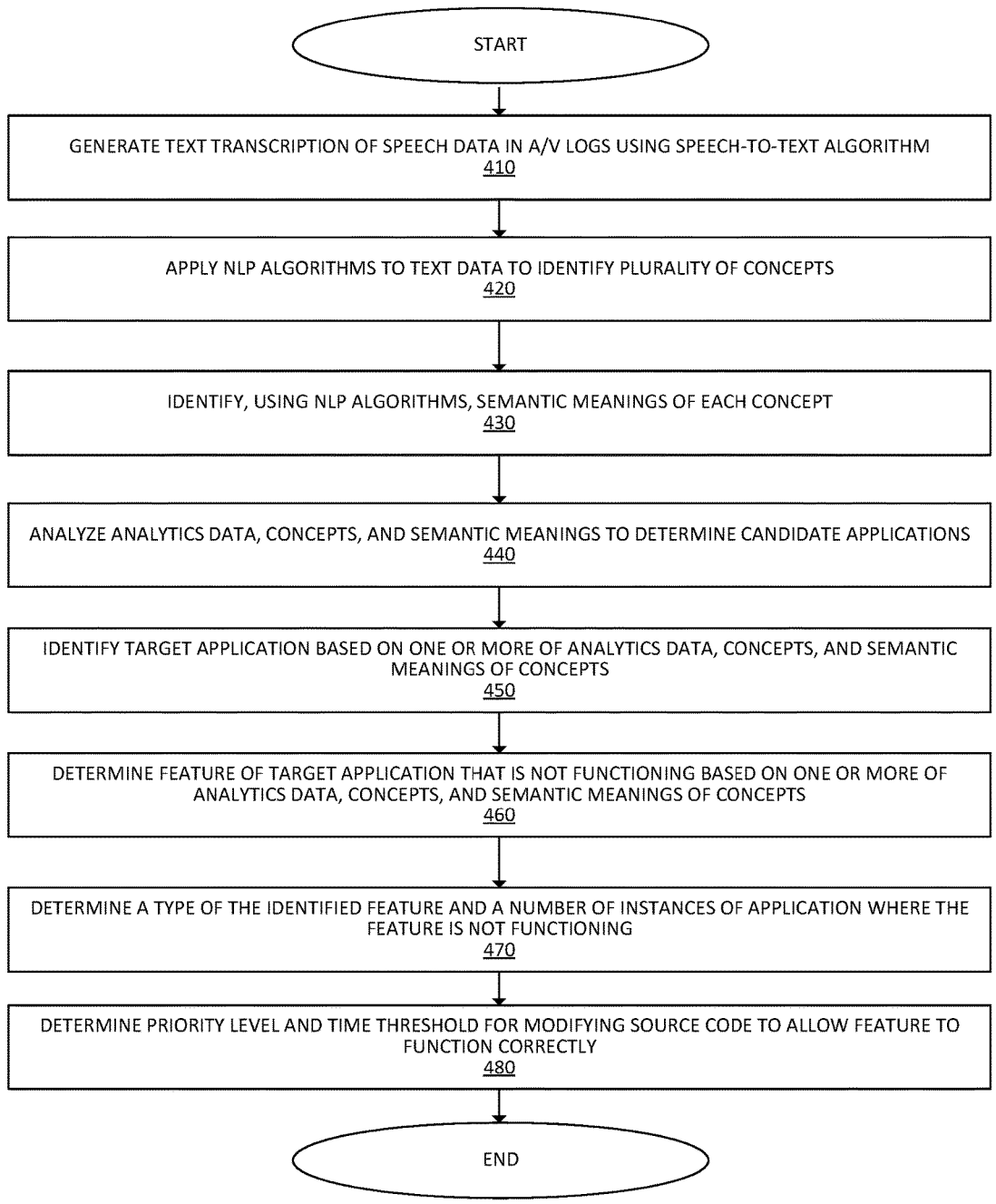
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 400 may include some or all of the operations to use customer service interactions and website analytics to identify unreported issues in computing applications. Embodiments are not limited in this context.

As shown, the logic flow 400 begins at block 410, where the speech-to-text algorithms 106 are applied to the audio data of the A/V logs 111 to generate text transcriptions of spoken conversations between the CSPs and users. At block 420, the NLP algorithms 105 are applied to the text data (e.g., the text transcripts generated at block 410 and/or received analytics data 115) to identify a plurality of concepts in the text data. The concepts may indicate one or more applications, services, and/or features that are not functioning properly but have not been reported. At block 430, the NLP algorithms 105 determine a semantic meaning of each concept identified at block 420.

At block 440, the reporting application 104 and/or the NLP algorithms 105 analyze the analytics data 115, the determined concepts, and determined semantic meanings to determine one or more candidate applications 113 that are not functioning correctly on a specified server. At block 450, the reporting application 104 identifies one of the candidate applications as a target application that is not functioning correctly. For example, the reporting application 104 may compute a score for each candidate application based on the concepts, semantic meanings, and web analytics data 115. The reporting application 104 may then select the candidate application having the highest score as the target application.

At block 460, the reporting application 104 determines a feature of the target application that is not functioning correctly based on the analytics data 115, the determined concepts, and determined semantic meanings. At block 470, the reporting application 104 determines a type of the feature determined block 460, and a number of instances of the target application that are affected (e.g., where the feature is not functioning correctly). For example, the analytics data 115 may specify which instances of the application are experiencing errors, and which instances are functioning correctly. The type of the feature may be identified based on a concept identified at block 420. At block 480, the reporting application 104 determines a priority level and a time threshold for modifying the source code of the target application to allow the feature to function correctly. In at least one embodiment, the priority level is based on the type of the function (e.g., a critical business function) and the number of instances that are not functioning correctly. Doing so allows the reporting application 104 to generate a record in the service issues 107 identifying the target application, the feature that is not functioning properly, the priority level, and the time threshold. The reporting application 104 may further indicate in the service issue record 107 a location in the source code 114 of the target application that may be causing the service issue. Doing so may allow a user reviewing the record in the service issues 107 to quickly resolve the service issue by modifying the source code 114.

Figure 5:
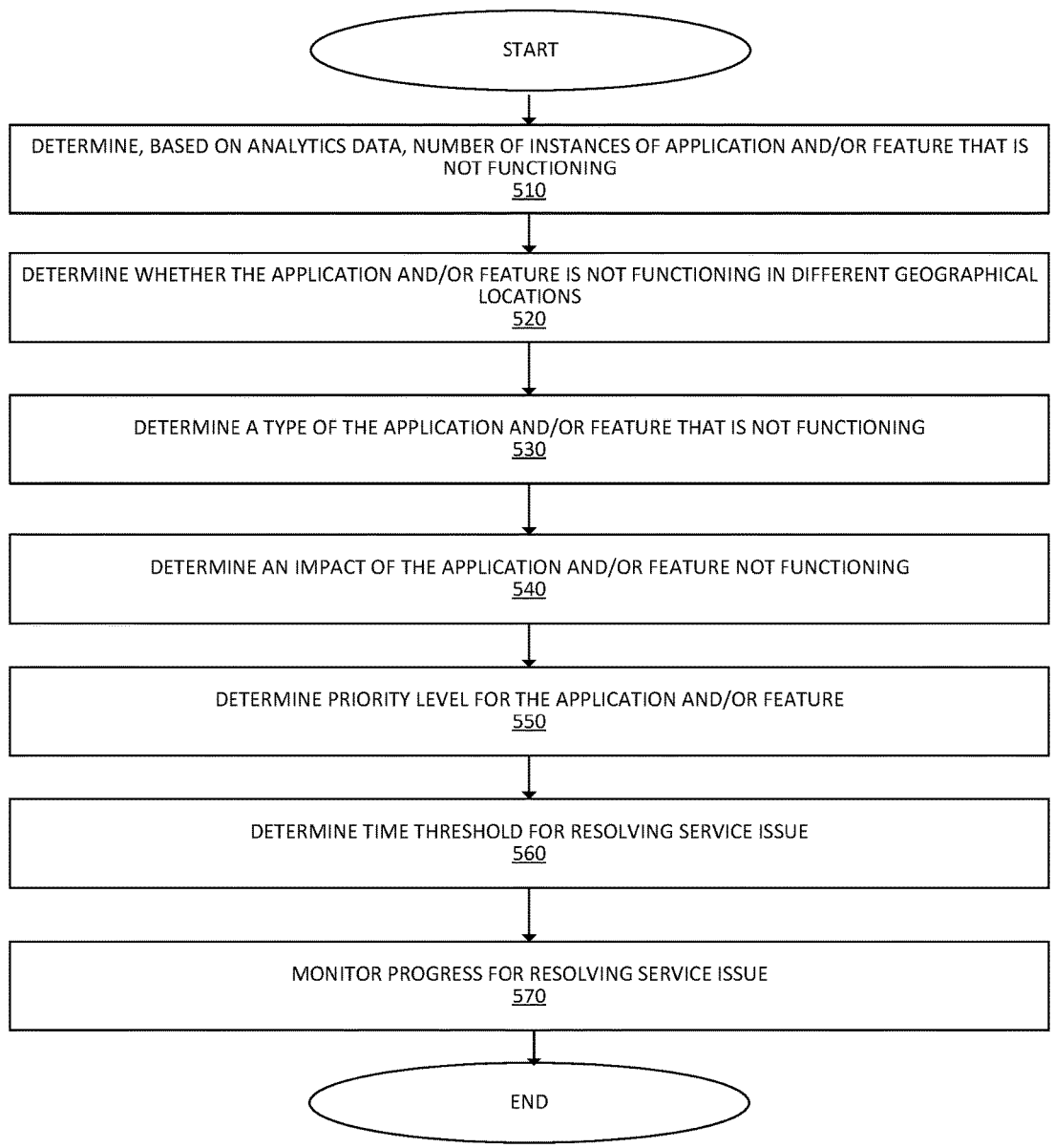
FIG. 5 illustrates an embodiment of a third logic flow.

FIG. 5 illustrates an embodiment of a logic flow 500. The logic flow 500 may be representative of some or all of the operations executed by one or more embodiments described herein. For example, the logic flow 500 may include some or all of the operations to determine a priority level for a service issue 107. Embodiments are not limited in this context.

As shown, the logic flow 500 begins at block 510, where the reporting application 104 determines, based on the analytics data 115, a number of instances of an application (and/or a feature of the application) that is not functioning. For example, the analytics data 115 of a first server may indicate each instance of the application executing in virtual machines on the first server is not functioning (e.g., based on error logs), while the analytics data 115 of a second server indicates each instance of the application is functioning properly. At block 520, the reporting application 104 determines whether the application and/or feature is functioning properly in all geographic regions based on the analytics data 115. For example, the first server may be in the United States, while the second server may be in Europe. The reporting application 104 may then determine that the service issue is constrained to the United States.

At block 530, the reporting application 104 determines a type of the application and/or feature that is not functioning correctly. The type may be determined based on the concepts extracted by the NLP algorithms 105, the analytics data 115 (e.g., a filename may indicate a type of function performed by the file), and/or a data describing the type of each application and the criticality of each application. At block 540, the reporting application 104 determines an impact of the feature and/or application that is not functioning. The impact may be a financial impact, public relations impact, customer loyalty impact, etc. At block 550, the reporting application 104 determines the priority level based on the determinations made at blocks 510-550. For example, the reporting application 104 may compute a score for the service issue based on a weighting of each determination made at blocks 510-550. At block 560, the reporting application 104 determines the time threshold for resolving the service issue 107, e.g., based on the determined priority level. At block 570, the reporting application 104 may monitor the progress toward resolving the service issue. For example, the reporting application 104 may periodically analyze the analytics data 115 CSP reports 109, user reports 110, A/V logs 111, and/or text logs 112 to determine if the service issue still exists. If so, the reporting application 104 may send reminders, escalate the issue, etc.

Figure 6:
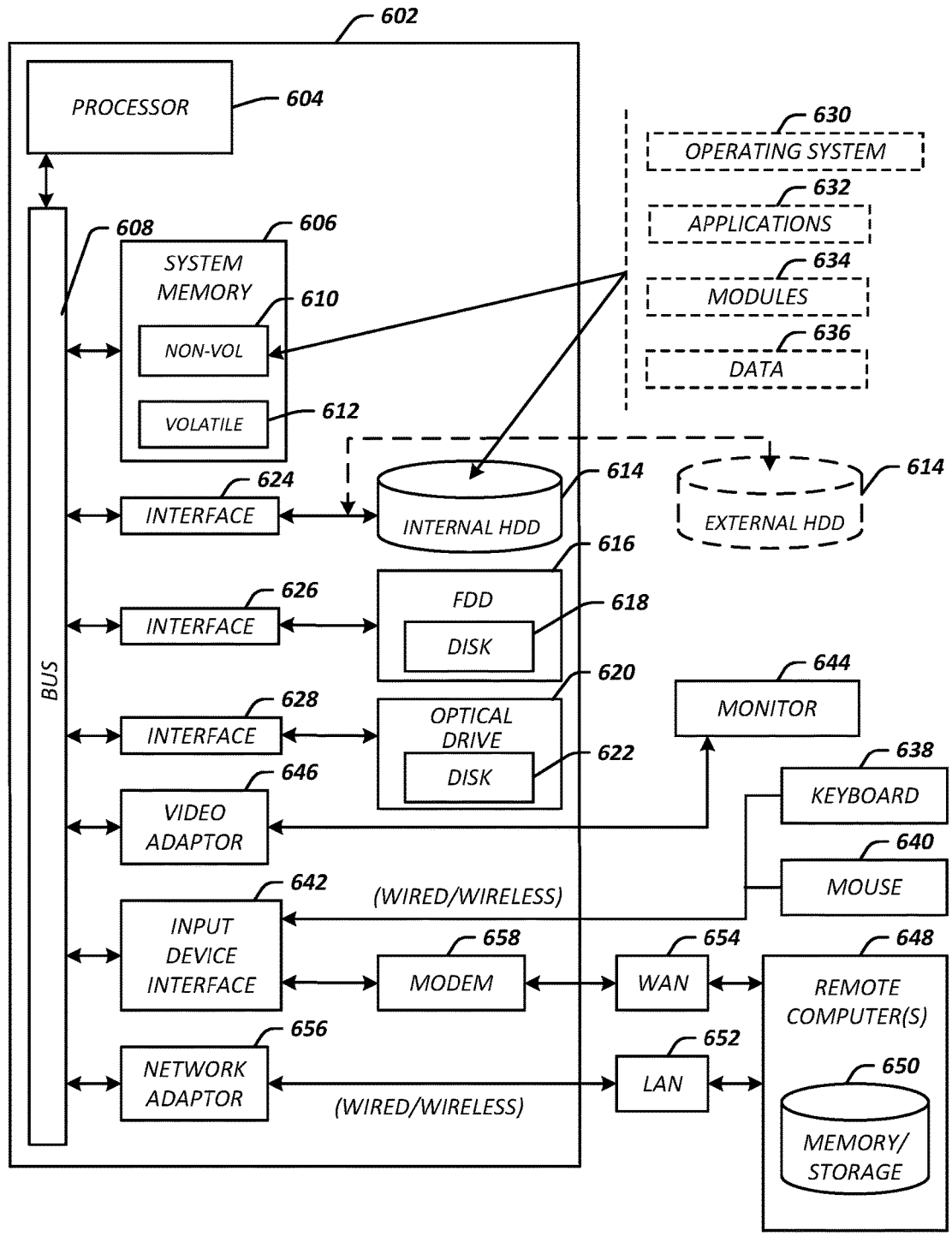
FIG. 6 illustrates an embodiment of a computing architecture.

FIG. 6 illustrates an embodiment of an exemplary computing architecture 600 comprising a computing system 602 that may be suitable for implementing various embodiments as previously described. In various embodiments, the computing architecture 600 may comprise or be implemented as part of an electronic device. In some embodiments, the computing architecture 600 may be representative, for example, of a system that implements one or more components of the system 100. In some embodiments, computing system 602 may be representative, for example, of the computing system 101, customer service platforms 102, and data platforms 103 of the system 100. The embodiments are not limited in this context. More generally, the computing architecture 600 is configured to implement all logic, applications, systems, methods, apparatuses, and functionality described herein with reference to FIGS. 1-5.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 602 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 602.

As shown in FIG. 6, the computing system 602 comprises a processor 604, a system memory 606 and a system bus 608. The processor 604 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 604.

The system bus 608 provides an interface for system components including, but not limited to, the system memory 606 to the processor 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computing system 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies. The computing system 602 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100, e.g., the reporting application 104, NLP algorithms 105, speech-to-text algorithms 106, user interfaces 108, and applications 113.

A user can enter commands and information into the computing system 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computing system 602. In addition to the monitor 644, a computer typically includes other peripheral output devices, such as speakers, printers, and so forth.

The computing system 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computing system 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 652 and the WAN 654.

When used in a LAN networking environment, the computing system 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computing system 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computing system 602, or portions thereof, can be stored in the remote memory/storage device 650. It will be appreciated that the network connections shown are exemplary and other means of establishing a communications link between the computers can be used.

The computing system 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
   a processor circuit; and
   a memory storing instructions which when executed by the processor circuit, cause the processor circuit to:
      receive communication data comprising recordings of communications between a customer service professional (CSP) and a user;
      analyze the communication data using a natural language processing (NLP) algorithm to identify a plurality of concepts in the communication data;
      identify, based at least in part on the plurality of concepts, a target application associated with the communications between the CSP and the user;
      receive analytics data from a web server hosting the target application;
      identify, based at least in part on the plurality of concepts and the received analytics data, a feature of the target application hosted by the web server that is not functioning;
      determine a number of instances of the target application where the feature is not functioning based on the received analytics data;
      assign a priority to the feature of the target application that is not functioning based at least in part on a type of the feature, the determined number of instances of the target application where the feature is not functioning, and the received analytics data, wherein the priority is a first priority value of a plurality of priority values; and
      generate a service issue record specifying the feature of the target application that is not functioning and the assigned priority, the service issue record to facilitate an analysis of a source code of the target application.

2. The apparatus of claim 1, the memory storing instructions which when executed by the processor circuit, cause the processor circuit to:
   receive a report from the CSP indicating at least one operation used to resolve an issue for the user, the issue related to the feature of the target application that is not functioning; and
   identify that the feature of the target application is not functioning based on the report from the CSP indicating the at least one operation used to resolve the issue for the user.

3. The apparatus of claim 2, the memory storing instructions which when executed by the processor circuit, cause the processor circuit to:
   generate, in the service issue record, an indication of the at least one operation used to cause the feature to function to facilitate the analysis of the source code of the target application; and
   determine a location of the feature in the source code of the target application based on the received analytics data.

4. The apparatus of claim 1, the memory storing instructions which when executed by the processor circuit, cause the processor circuit to:
   determine, based on the assigned priority, a time deadline to modify the source code of the target application to cause the feature to function correctly; and
   generate, in the service issue record, an indication of the time deadline to modify the source code of the target application to cause the feature to function correctly, wherein the service issue record is outputted for display.

5. The apparatus of claim 1, wherein the communication data comprises an audio/video log comprising speech data, the memory storing instructions which when executed by the processor circuit, cause the processor circuit to:
convert the speech data to text data using a speech-to-text algorithm, wherein the text data is analyzed using the NLP algorithm to identify the plurality of concepts.

6. The apparatus of claim 5, the memory storing instructions which when executed by the processor circuit, cause the processor circuit to:
identify, by the NLP algorithm, a semantic meaning of each of the plurality of concepts; and
identify the feature of the target application that is not functioning based on the semantic meaning of each of the plurality of concepts.

7. The apparatus of claim 1, the memory storing instructions which when executed by the processor circuit, cause the processor circuit to:
receive communication data comprising a text chat log between the CSP and a second user;
analyze the text chat log using the NLP algorithm to identify a plurality of concepts in the text chat log; and
identify the feature of the target application that is not functioning based on the analysis of the text chat log and the identified plurality of concepts in the text chat log.

8. A non-transitory computer-readable storage medium having computer-readable program code embodied therewith, the computer-readable program code executable by a processor circuit to cause the processor circuit to:
receive communication data comprising recordings of communications between a customer service professional (CSP) and a user;
analyze the communication data using a natural language processing (NLP) algorithm to identify a plurality of concepts in the communication data;
identify, based at least in part on the plurality of concepts, a target application associated with the communications between the CSP and the user;
receive analytics data from a web server hosting the target application, the analytics data generated based at least in part on analytics data of the web server;
identify a feature of the target application hosted by the web server that is not functioning based at least in part on: (i) the plurality of concepts and the received analytics data, (ii) a number of requests to use the feature of the target application specified in the analytics data, and (iii) a number of errors in the analytics data of the web server;
assign a priority to the feature of the target application that is not functioning based at least in part on a type of the feature and the received analytics data; and
generate a service issue record specifying the feature of the target application that is not functioning and the assigned priority, the service issue record to facilitate an analysis of a source code of the target application.

9. The non-transitory computer-readable storage medium of claim 8, further comprising computer-readable program code executable by the processor circuit to cause the processor circuit to:
receive a report from the CSP indicating at least one operation used to resolve an issue for the user, the issue related to the feature of the target application that is not functioning; and
identify that the feature of the target application is not functioning based on the report from the CSP indicating the at least one operation used to resolve the issue for the user.

10. The non-transitory computer-readable storage medium of claim 9, further comprising computer-readable program code executable by the processor circuit to cause the processor circuit to:
determine a number of instances of the target application where the feature is not functioning based on the received analytics data; and
assign the priority based on the determined number of instances of the target application where the feature is not functioning, wherein the priority is a first priority value of a plurality of priority values.

11. The non-transitory computer-readable storage medium of claim 8, further comprising computer-readable program code executable by the processor circuit to cause the processor circuit to:
determine, based on the assigned priority, a time threshold for modifying the source code of the target application to cause the feature to function correctly; and
generate, in the service issue record, an indication of the time threshold for modifying the source code of the target application to cause the feature to function correctly, wherein the service issue record is outputted for display.

12. The non-transitory computer-readable storage medium of claim 8, wherein the communication data comprises an audio/video log comprising speech data, further comprising computer-readable program code executable by the processor circuit to cause the processor circuit to:
convert the speech data to text data using a speech-to-text algorithm, wherein the text data is analyzed using the NLP algorithm to identify the plurality of concepts;
identify, by the NLP algorithm, a semantic meaning of each of the plurality of concepts; and
identify the feature of the target application that is not functioning based on the semantic meaning of each of the plurality of concepts.

13. The non-transitory computer-readable storage medium of claim 8, further comprising computer-readable program code executable by the processor circuit to cause the processor circuit to:
receive communication data comprising a text chat log between the CSP and a second user;
analyze the text chat log using the NLP algorithm to identify a plurality of concepts in the text chat log; and
identify the feature of the target application that is not functioning based on the analysis of the text chat log and the identified plurality of concepts in the text chat log.

14. A method, comprising:
receiving communication data comprising recordings of communications between a customer service professional (CSP) and a user;
analyzing the communication data using a natural language processing (NLP) algorithm executing on a computer processor to identify a plurality of concepts in the communication data;
identifying, based at least in part on the plurality of concepts, a target application associated with the communications between the CSP and the user;
receiving analytics data from a web server hosting the target application;

identifying, based at least in part on the plurality of concepts and the received analytics data, a feature of the target application hosted by the web server that is not functioning;

assigning a priority to the feature of the target application that is not functioning based at least in part on a type of the feature and the received analytics data;

generating a service issue record specifying the feature of the target application that is not functioning and the assigned priority, the service issue record to facilitate an analysis of a source code of the target application;

determining, based on the assigned priority, a time threshold for modifying the source code of the target application to cause the feature to function correctly; and generating, in the service issue record, an indication of the time threshold for modifying the source code of the target application to cause the feature to function correctly, wherein the service issue record is outputted for display.

15. The method of claim 14, further comprising:

receiving a report from the CSP indicating at least one operation used to resolve an issue for the user, the issue related to the feature of the target application that is not functioning; and identifying that the feature of the target application is not functioning based on the report from the CSP indicating the at least one operation used to resolve the issue for the user.

16. The method of claim 15, further comprising:

generating, in the service issue record, an indication of the at least one operation used to cause the feature to function to facilitate the analysis of the source code of the target application;

determining a location of the feature in the source code of the target application based on the received analytics data; and outputting an indication of the identified location in the source code of the target application for display.

17. The method of claim 14, further comprising:

receiving communication data comprising a text chat log between the CSP and a second user;

analyzing the text chat log using the NLP algorithm to identify a plurality of concepts in the text chat log; and identifying the feature of the target application that is not functioning based on the analysis of the text chat log and the identified plurality of concepts in the text chat log.

18. The method of claim 14, wherein the communication data comprises an audio/video log comprising speech data, the method further comprising:

converting the speech data to text data using a speech-to-text algorithm, wherein the text data is analyzed using the NLP algorithm to identify the plurality of concepts;

identifying, by the NLP algorithm, a semantic meaning of each of the plurality of concepts; and identifying the feature of the target application that is not functioning based on the semantic meaning of each of the plurality of concepts.

\* \* \* \* \*